(12) United States Patent
Huang et al.

(10) Patent No.: US 11,804,934 B2
(45) Date of Patent: Oct. 31, 2023

(54) REFERENCE SIGNALING FOR SIDELINK COMMUNICATION

(71) Applicant: QUALCOMM Incorporated, San Diego, CA (US)

(72) Inventors: Yi Huang, San Diego, CA (US); Wei Yang, San Diego, CA (US); Seyedkianoush Hosseini, San Diego, CA (US); Tugcan Aktas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/444,642

(22) Filed: Aug. 6, 2021

(65) Prior Publication Data
US 2022/0052810 A1 Feb. 17, 2022

Related U.S. Application Data

(60) Provisional application No. 62/706,349, filed on Aug. 11, 2020.

(51) Int. Cl.
*H04L 5/00* (2006.01)
*H04L 25/02* (2006.01)
*H04L 27/18* (2006.01)

(52) U.S. Cl.
CPC ........ *H04L 5/0048* (2013.01); *H04L 25/0224* (2013.01); *H04L 27/18* (2013.01)

(58) Field of Classification Search
CPC .............................. H04L 5/0048; H04L 27/18
See application file for complete search history.

(56) References Cited

U.S. PATENT DOCUMENTS

| 11,122,527 | B2 * | 9/2021 | Li .......................... H04W 72/20 |
| 2011/0263286 | A1 * | 10/2011 | Damnjanovic ..... H04W 74/008 |
| | | | 455/509 |
| 2015/0289292 | A1 * | 10/2015 | Sun ....................... H04L 5/0092 |
| | | | 370/329 |
| 2018/0048446 | A1 * | 2/2018 | Jiang ..................... H04L 5/0051 |
| 2018/0279311 | A1 * | 9/2018 | Yoo ....................... H04W 8/245 |
| 2019/0044775 | A1 * | 2/2019 | Zhang .................. H04L 5/0051 |

(Continued)

FOREIGN PATENT DOCUMENTS

| CN | 110086582 A | 8/2019 |
| WO | 2019061167 A1 | 4/2019 |

OTHER PUBLICATIONS

International Search Report and Written Opinion—PCT/US2021/071140—ISA/EPO—dated Dec. 1, 2021.

*Primary Examiner* — Zhiren Qin
(74) *Attorney, Agent, or Firm* — Harrity & Harrity LLP/Qualcomm Incorporated

(57) ABSTRACT

Various aspects of the present disclosure generally relate to wireless communication. In some aspects, a source user equipment (UE) may transmit, on a sidelink interface, a first reference signal associated with the source UE. The source UE may receive, from a destination UE, a second reference signal associated with the destination UE based at least in part on the first reference signal. The source UE may perform a transmission to the destination UE based at least in part on a channel estimation operation performed based at least in part on the second reference signal. Numerous other aspects are provided

30 Claims, 8 Drawing Sheets

(56) References Cited

U.S. PATENT DOCUMENTS

| | | | | |
|---|---|---|---|---|
| 2019/0268904 | A1* | 8/2019 | Miao | H04W 52/02 |
| 2019/0394810 | A1* | 12/2019 | Patel | H04W 74/0891 |
| 2021/0051643 | A1* | 2/2021 | Jiang | H04B 7/0426 |
| 2021/0274578 | A1* | 9/2021 | Yum | H04L 1/0006 |
| 2021/0298030 | A1* | 9/2021 | Li | H04W 72/23 |
| 2022/0039080 | A1* | 2/2022 | Khoryaev | H04W 4/40 |
| 2022/0061055 | A1* | 2/2022 | Freda | H04W 72/53 |

* cited by examiner

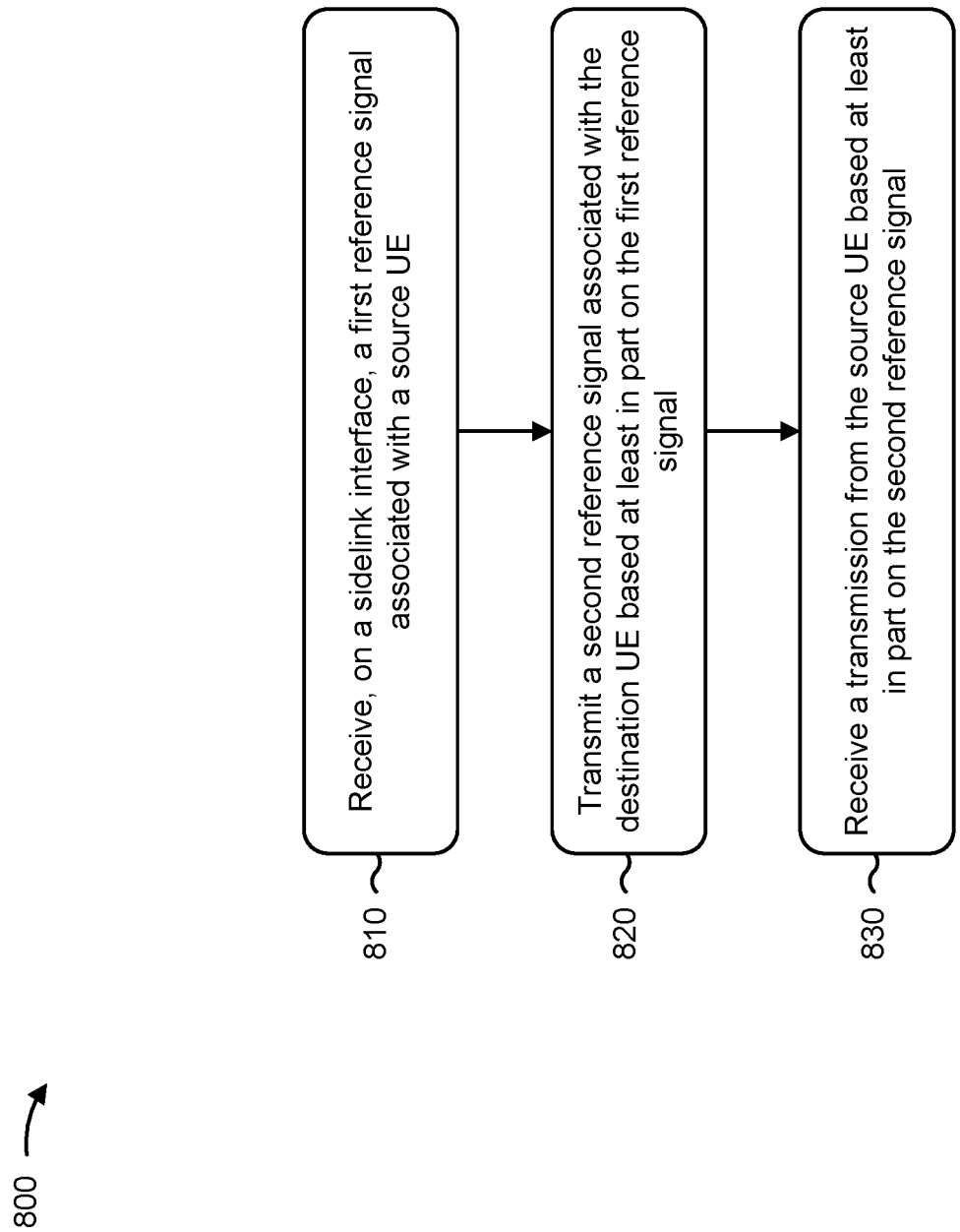

REFERENCE SIGNALING FOR SIDELINK COMMUNICATION

CROSS-REFERENCE TO RELATED APPLICATION

This patent application claims priority to U.S. Provisional Patent Application No. 62/706,349, filed on Aug. 11, 2020, entitled "REFERENCE SIGNALING FOR SIDELINK COMMUNICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for reference signaling for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a source user equipment (UE) includes: transmitting, on a sidelink interface, a first reference signal associated with the source UE; receiving, from a destination UE, a second reference signal associated with the destination UE based at least in part on the first reference signal; and performing a transmission to the destination UE based at least in part on a channel estimation operation performed based at least in part on the second reference signal.

In some aspects, a method of wireless communication performed by a destination UE includes: receiving, on a sidelink interface, a first reference signal associated with a source UE; transmitting a second reference signal associated with the destination UE based at least in part on the first reference signal; and receiving a transmission from the source UE based at least in part on the second reference signal.

In some aspects, a source UE for wireless communication includes: a memory, a transceiver, and one or more processors coupled to the memory, the one or more processors configured to: transmit, on a sidelink interface via the transceiver, a first reference signal associated with the source UE; receive, from a destination UE via the transceiver, a second reference signal associated with the destination UE based at least in part on the first reference signal; and transmit, to the destination UE, a transmission based at least in part on a channel estimation operation performed based at least in part on the second reference signal.

In some aspects, a destination UE for wireless communication includes: a memory, a transceiver, and one or more processors coupled to the memory, the one or more processors configured to: receive, on a sidelink interface via the transceiver, a first reference signal associated with a source UE; transmit, via the transceiver, a second reference signal associated with the destination UE based at least in part on the first reference signal; and receive, via the transceiver, a transmission from the source UE based at least in part on the second reference signal.

In some aspects, a non-transitory computer-readable medium storing a set of instructions for wireless communication includes: one or more instructions that, when executed by one or more processors of a source UE, cause the source UE to: transmit, on a sidelink interface, a first reference signal associated with the source UE; receive, from a destination UE, a second reference signal associated with the destination UE based at least in part on the first reference signal; and perform a transmission to the destination UE based at least in part on a channel estimation operation performed based at least in part on the second reference signal.

In some aspects, a non-transitory computer-readable medium storing a set of instructions for wireless communication includes: one or more instructions that, when executed by one or more processors of a destination UE, cause the destination UE to: receive, on a sidelink interface, a first reference signal associated with a source UE; transmit a second reference signal associated with the destination UE based at least in part on the first reference signal; and receive a transmission from the source UE based at least in part on the second reference signal.

In some aspects, a first apparatus for wireless communication includes: means for transmitting, on a sidelink interface, a first reference signal associated with the first apparatus; means for receiving, from a second apparatus, a second reference signal associated with the second apparatus based at least in part on the first reference signal; and means for performing a transmission to the second apparatus based at least in part on a channel estimation operation performed based at least in part on the second reference signal.

In some aspects, a destination apparatus for wireless communication includes: means for receiving, on a sidelink interface, a first reference signal associated with a source apparatus; means for transmitting a second reference signal associated with the destination apparatus based at least in part on the first reference signal; and means for receiving a transmission from the source apparatus based at least in part on the second reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating example processes associated with reference signaling for sidelink communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
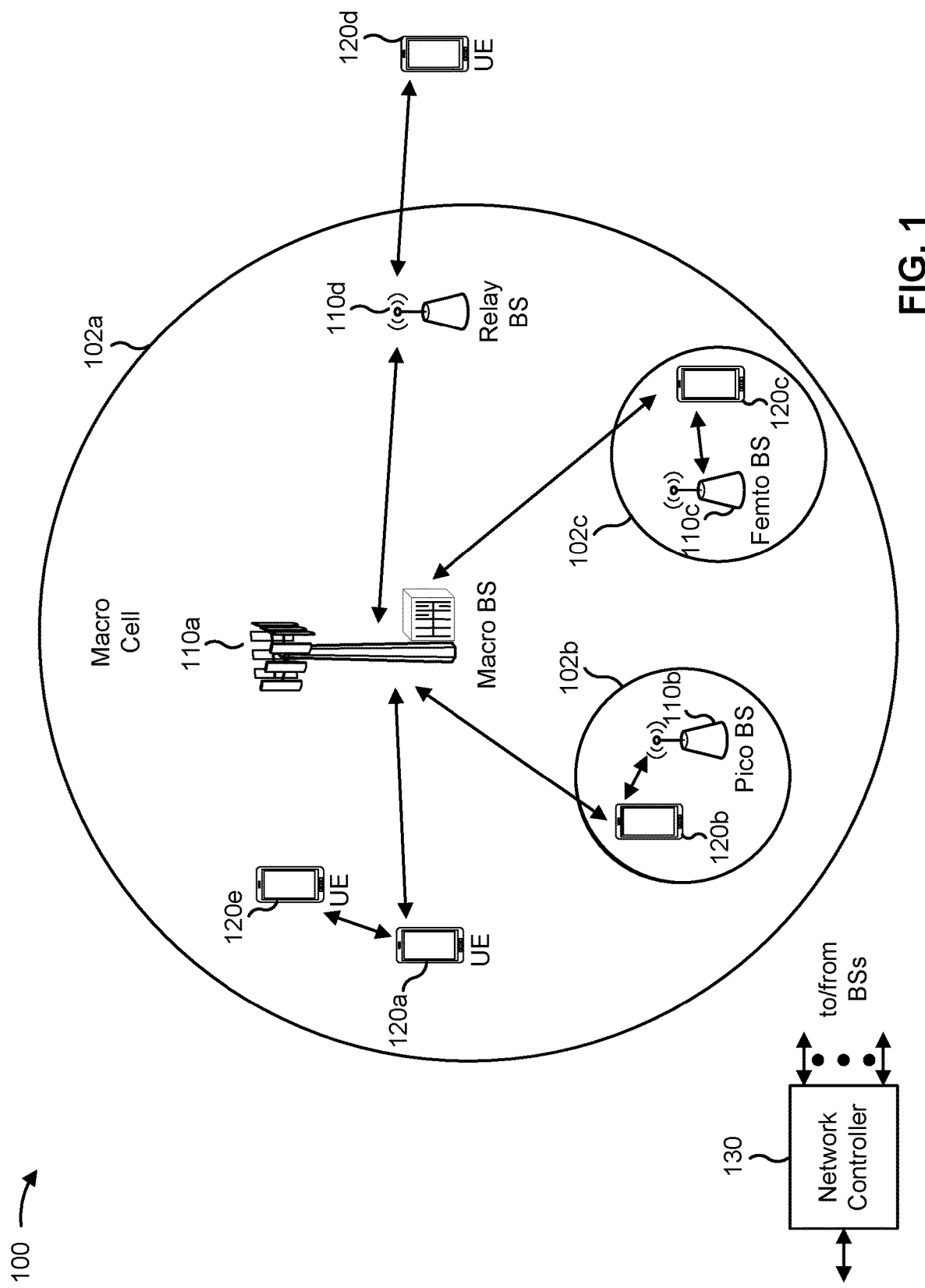
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
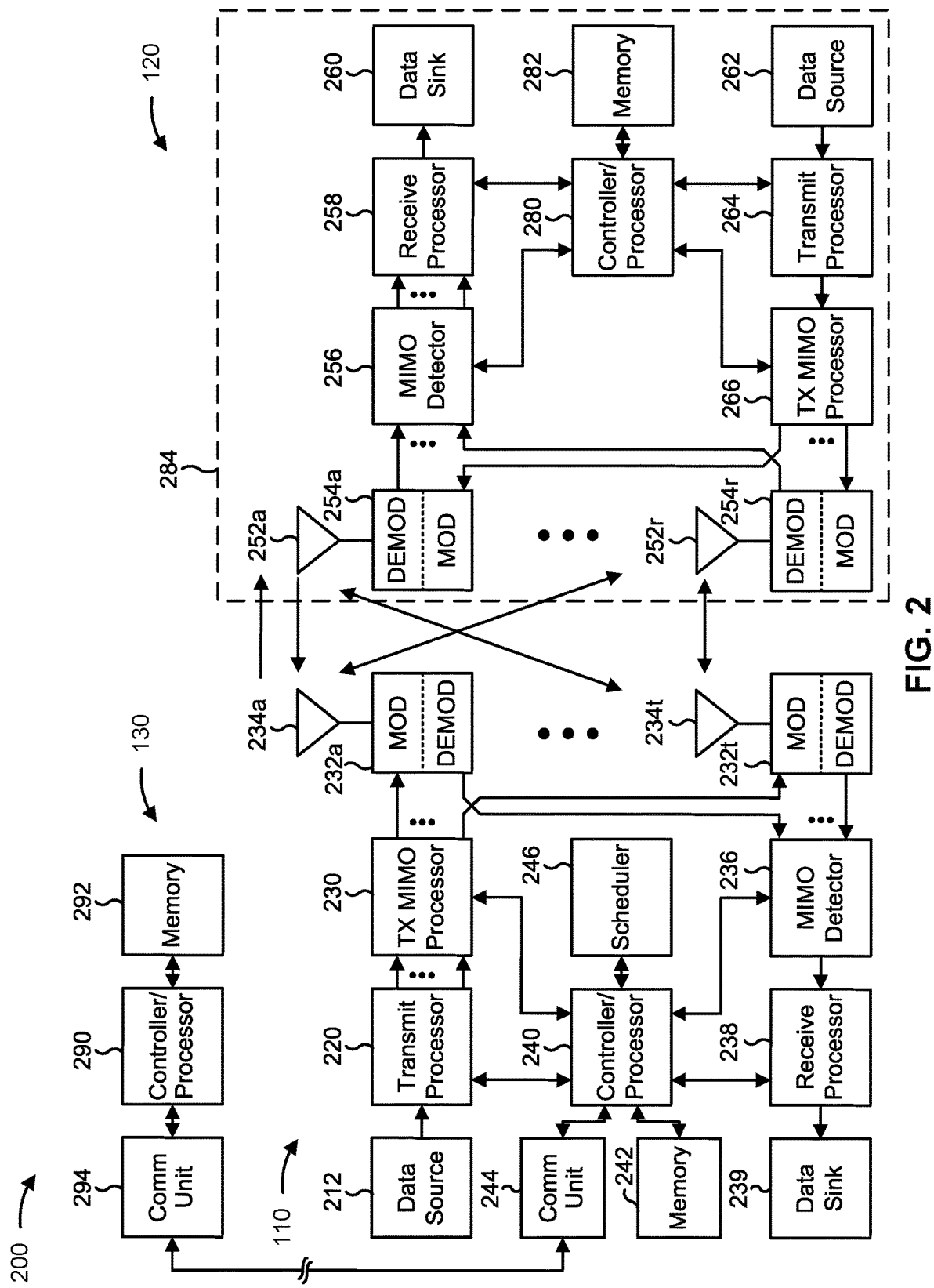
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with reference signaling for sidelink communication, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a source UE (e.g., UE 120) may include means for transmitting, on a sidelink interface, a first reference signal associated with the source UE (e.g., using controller/processor 280, transmit processor 264, TX MIMO processor 266, MOD 254, antenna 252, and/or memory 282); means for receiving, from a destination UE, a second reference signal associated with the destination UE based at least in part on the first reference signal (e.g., using antenna 252, DEMOD 254, MIMO detector 256, receive processor 258, controller/processor 280, and/or memory 282); and/or means for performing a transmission to the destination UE based at least in part on a channel estimation operation performed based at least in part on the second reference signal (e.g., using controller/processor 280, transmit processor 264, TX MIMO processor 266, MOD 254, antenna 252, and/or memory 282).

In some aspects, a destination UE (e.g., UE 120) may include means for receiving, on a sidelink interface, a first reference signal associated with a source UE (e.g., using antenna 252, DEMOD 254, MIMO detector 256, receive processor 258, controller/processor 280, and/or memory 282); means for transmitting a second reference signal associated with the destination UE based at least in part on the first reference signal (e.g., using controller/processor 280, transmit processor 264, TX MIMO processor 266, MOD 254, antenna 252, and/or memory 282); and/or means for receiving a transmission from the source UE based at least in part on the second reference signal (e.g., using antenna 252, DEMOD 254, MIMO detector 256, receive processor 258, controller/processor 280, and/or memory 282).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
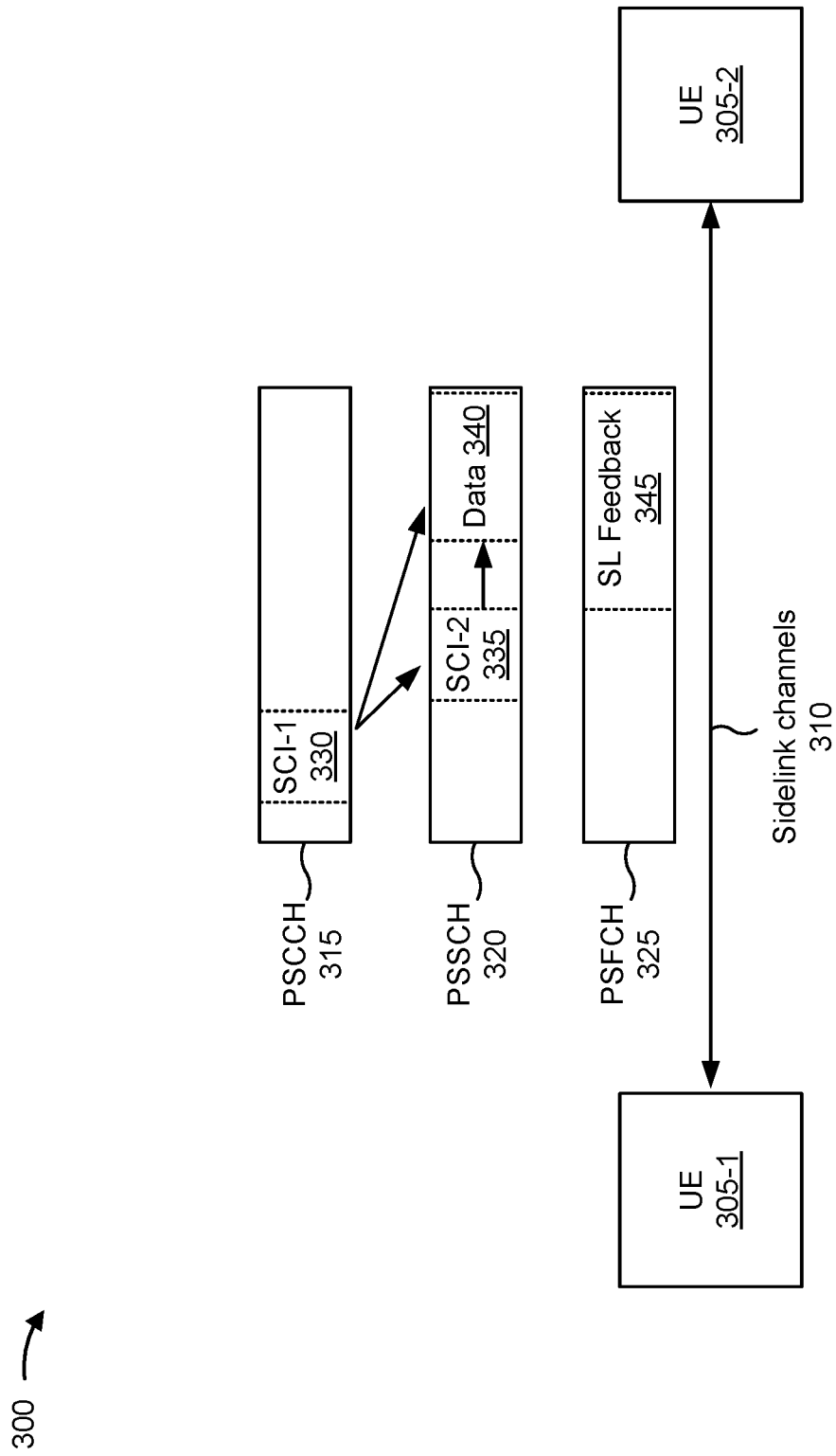
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications), and/or mesh networking. In some aspects, the UEs 305 (e.g., UE 305-1 and/or UE 305-2) may include one or more other UEs described elsewhere herein, such as UE 120. In some aspects, the one or more sidelink channels 310 may use a PC5 interface, may operate in a high frequency band (e.g., the 5.9 GHz band), and/or may operate on an unlicensed or shared frequency band (e.g., an NR unlicensed (NR-U) frequency band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

The PSCCH 315 may carry sidelink control information part 1 (SCI-1) 330, which may indicate various control information used for sidelink communications. The control information may include an indication of one or more resources (e.g., time resources, frequency resources, and/or spatial resources) where various types of information may be carried on the PSSCH 320, information for decoding sidelink communications on the PSSCH 320, a quality of service (QoS) priority value, a resource reservation period, a PSSCH demodulation reference signal (DMRS) pattern, a an SCI format and a beta offset for sidelink control information part 2 (SCI-2) 335 transmitted on the PSSCH 320, a quantity of PSSCH DMRS ports, and/or an MCS.

The information carried on the PSSCH 320 may include the SCI-2 335 and/or data 340. The SCI-2 335 may include various types of information, such as a hybrid automatic repeat request (HARQ) process identifier (ID), a new data indicator (NDI) associated with the data 340, a source identifier, a destination identifier, and/or a channel state information (CSI) report trigger. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), and/or a scheduling request (SR).

As indicated above, FIG. 3 is provided as an example. Other examples may differ from what is described with respect to FIG. 3.

Figure 4:
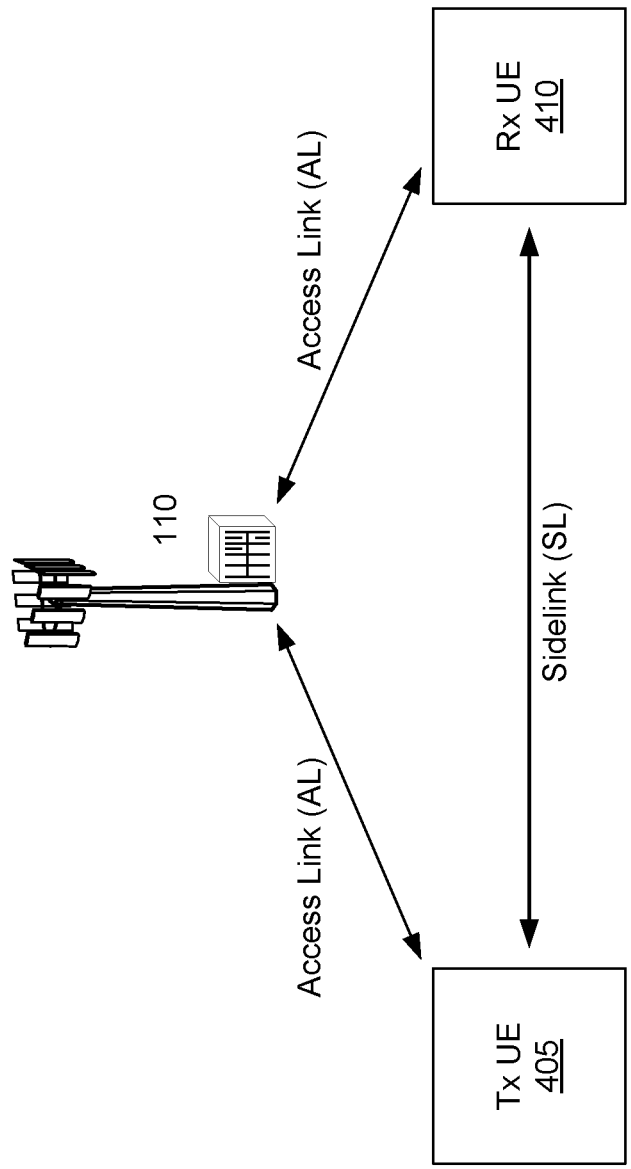
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may include one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the Tx UE 405 may operate in a resource allocation mode in which the base station 110 reserves and allocates sidelink resources for the Tx UE 405. This may be referred to as Mode 1 sidelink resource allocation. In some aspects, the Tx UE 405 may operate in a resource allocation mode in which sidelink resource selection and/or scheduling is performed by the Tx UE 405 (e.g., rather than the base station 110). This may be referred to as Mode 2 sidelink resource allocation.

In a Mode 1 sidelink resource allocation scheme, the base station 110 may transmit a sidelink grant to the Tx UE 405 via the access link. The sidelink grant may be a dynamic grant (e.g., received in a downlink control information (DCI) communication) or a semi-static/configured grant (e.g., received in a radio resource control (RRC) communication). For semi-static/configured grants, the base station 110 may activate a sidelink grant in the same RRC communication that configures the sidelink grant (referred to as a Type 1 configured grant) or may activate the sidelink grant in a DCI communication (referred to as a Type 2 configured grant).

As indicated above, FIG. 4 is provided as an example. Other examples may differ from what is described with respect to FIG. 4.

Sidelink channel state information (SL-CSI) reporting may be supported for unicast communications. A first UE (e.g., a requesting UE or a source UE) may send an SCI-1 via a PSCCH to a second UE (e.g., a reporting UE or a destination UE). The first UE may send an SCI-2 via a PSSCH to the second UE. The first UE may trigger an aperiodic (AP) SL-CSI report based at least in part on a 1-bit value included in the SCI-2 transmitted from the first UE to the second UE. The first UE may further transmit a narrowband channel state information reference signal (CSI-RS) in an associated PSSCH to the second UE. The CSI-RS transmitted in the PSSCH by the first UE may not conflict or overlap with other channels and/or transmissions, such as the PSCCH, a demodulation reference signal (DMRS) transmitted in the PSSCH, and/or a phase tracking reference signal (PTRS). The second UE may receive the CSI-RS and measure a sidelink CSI based at least in part on the CSI-RS received from the first UE. The second UE may transmit or report the sidelink CSI to the first UE using a medium access control (MAC) control element (CE) via the PSSCH. The sidelink CSI may include a 1-bit rank indicator and a 4-bit channel quality indicator (CQI). The sidelink CSI may not include precoding matrix indicator (PMI) feedback.

In SL-CSI reporting, a narrowband CSI-RS transmitted in a PSSCH by a first UE to a second UE may trigger the second UE to report sidelink CSI without PMI feedback. The first UE may transmit data to the second UE via the PSSCH using transmission parameters based at least in part on the sidelink CSI received from the second UE. The transmission parameters may include a precoding matrix, a resource block allocation, and/or an MCS. However, without the PMI feedback in the sidelink CSI, the transmission parameters used by the first UE may be less accurate. As a result, the data transmitted by the first UE via the PSSCH may not be transmitted using transmission parameters that accurately reflect the sidelink CSI received from the second UE.

Various aspects of techniques and apparatuses described herein may facilitate improving PSSCH transmissions from a first UE (or source UE) to a second UE (or destination UE) by introducing a wideband beacon-echo procedure between the first UE and the second UE. The first UE may transmit a wideband beacon reference signal (RS) to the second UE. The second UE may detect the wideband beacon RS and, in response, the second UE may transmit a wideband echo RS to the first UE. The first UE may perform a channel estimation based at least in part on the wideband echo RS received from the second UE. In other words, the first UE may estimate a channel (e.g., obtain sidelink CSI) between the first UE and the second UE based at least in part on the wideband echo RS received from the second UE. The first UE may determine transmission parameters (e.g., precoding matrix, resource allocation, and/or MCS) based at least in part on the estimated channel between the first UE and the second UE. The first UE may perform a PSSCH transmission based at least in part on the transmission parameters. By using the wideband beacon-echo procedure, the first UE may determine improved transmission parameters (e.g., an improved precoding matrix, and/or an improved resource block allocation). The transmission parameters may be improved as compared to transmission parameters that are determined using sidelink CSI reported from the second UE, where the sidelink CSI may be determined using the narrowband CSI-RS. The improved transmission parameters may improve the PSSCH transmission (e.g., a rank 2 PSSCH transmission) performed by the first UE.

Figure 5:
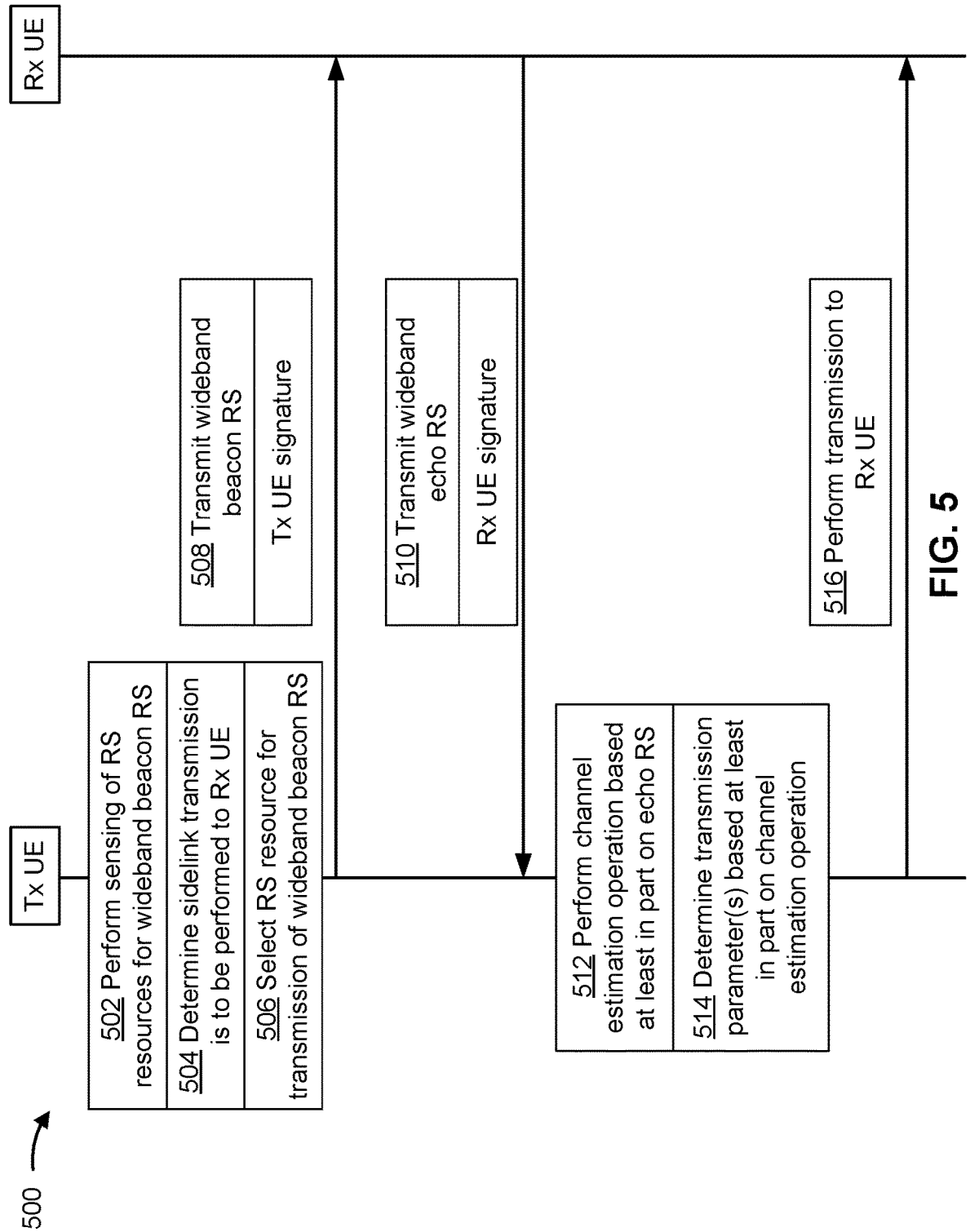
FIGS. 5-6 are diagrams illustrating examples associated with reference signaling for sidelink communication, in accordance with the present disclosure.

FIG. 5 is a diagram illustrating an example 500 of reference signaling for sidelink communication, in accordance with the present disclosure. As shown in FIG. 5, example 500 includes communication between a transmit UE (Tx UE or a first UE or a source UE, such as UE 120a) and a receive UE (Rx UE or a second UE or a destination UE, such as UE 120e). In some aspects, the Tx UE and the Rx UE may be included in a wireless network such as wireless network 100. The Tx UE and the Rx UE may communicate on a wireless sidelink.

In some aspects, a network (e.g., base station 110) may configure or set up a wideband RS resource pool. The wideband RS resource pool may be a cell-specific wideband RS reference pool. The wideband RS resource pool may include a plurality of wideband RS resources. A wideband RS resource may be defined as a wideband RS transmission opportunity in time and frequency. Wideband RS resources in the wideband RS resource pool may be orthogonalized via time division multiplexing (TDM) in a time domain and via frequency division multiplexing (FDM) in a frequency domain.

In some aspects, the wideband RS resources in the wideband RS resource pool may be used for a wideband beacon-echo procedure between the Tx UE and the Rx UE. The Tx UE and the Rx UE may be sidelink UEs. The wideband beacon-echo procedure may be used for sidelink channel estimation to obtain CSI between the Tx UE and the Rx UE. For example, the wideband beacon-echo procedure may be triggered between the Tx UE and the Rx UE when the Tx UE wakes up from a discontinuous reception (DRX) cycle, the Tx UE is handed over to another base station during a handover, and/or the Tx UE transitions from a DRX idle or inactive state to an active state.

As shown by reference number 502, the Tx UE may perform a sensing operation on a plurality of RS resources. The plurality of RS resources may correspond to a wideband RS resource pool (e.g., a cell-specific wideband RS reference pool) to be used for a wideband beacon-echo procedure by the Tx UE. The Tx UE may perform the sensing operation when the Tx UE does not currently have sidelink data to transmit. The Tx UE may sense the wideband RS resource pool according to a defined periodicity, depending on a Tx UE implementation. The Tx UE may sense an entire wideband RS resource pool or a portion of the wideband RS resource pool according to the defined periodicity, depending on the Tx UE implementation.

As shown by reference number 504, the Tx UE may determine a sidelink transmission is to be performed with the Rx UE. For example, the Tx UE may receive sidelink data to be transmitted to the Rx UE via the sidelink transmission.

As shown by reference number 506, the Tx UE may select an RS resource from the plurality of RS resources. For example, the Tx UE may select a wideband RS resource from the wideband RS resource pool, where the wideband RS resource may be used by the Tx UE for transmission of a wideband beacon RS.

In some aspects, the Tx UE may randomly select the wideband RS resource from the wideband RS resource pool. Random selection of the wideband RS resource in a time domain may mitigate a full duplex collision, which may occur when the Tx UE and the Rx UE transmit a wideband beacon RS at a same time and are not detected due to a half-duplex constraint. Random selection of the wideband RS resource in a frequency domain may mitigate a signature sequence interference or a signature sequence leakage, where a signature sequence may be used by the Tx UE for transmission of the wideband beacon RS.

In some aspects, the Tx UE may select the wideband RS resource from the wideband RS resource pool based at least in part on a wideband RS resource configuration received from a base station (e.g., base station 110). The wideband RS resource configuration may include an orthogonalized deterministic wideband RS resource partition, which may be configured by the base station. In this example, the Tx UE may be a relay device and the Tx UE may communicate with a plurality of other devices, such as wearable devices. The orthogonalized deterministic wideband RS resource partition may be for the Tx UE and the plurality of other devices. The orthogonalized deterministic wideband RS resource partition may be a subset of the wideband RS resource pool. The Tx UE may select the wideband RS resource based at least in part on the wideband RS resource configuration including the orthogonalized deterministic wideband RS resource partition received from the base station.

Alternatively, the Tx UE may not receive the wideband RS resource configuration from the base station. The Tx UE may instead configure the orthogonalized deterministic wideband RS resource partition among the Tx UE and the plurality of other devices.

As shown by reference number 508, the Tx UE may transmit the wideband beacon RS to the Rx UE using the selected wideband RS resource. The Tx UE may transmit the wideband beacon RS to the Rx UE over a sidelink interface. The wideband beacon RS may occupy an entirety of a configured bandwidth of the Tx UE, as opposed to a narrowband CSI-RS which may occupy a portion of the configured bandwidth of the Tx UE. The wideband beacon RS may be generated based at least in part on a signature sequence associated with the Tx UE. The signature sequence associated with the Tx UE may be a uniquely generated sequence based at least in part on a UE ID associated with the Tx UE. By generating the wideband beacon RS using the signature sequence associated with the Tx UE, the Rx UE may identify the Tx UE as transmitting the wideband beacon RS.

In some aspects, the Rx UE may detect or receive the wideband beacon RS from the Tx UE. The Rx UE may detect or receive the wideband beacon RS when the Rx UE does not currently have sidelink data to transmit. The Rx UE may select a wideband RS resource from the wideband RS resource pool for transmission of a wideband echo RS to the Tx UE. The wideband RS resource pool may be used for both communication of the wideband beacon RS and communication of the wideband echo RS. The Rx UE may randomly select the wideband RS resource from the wideband RS resource pool. The Rx UE may randomly select the wideband RS resource based at least in part on the wideband RS resource configuration received from the base station, where the wideband RS resource configuration may include the orthogonalized deterministic wideband RS resource partition. Alternatively, the Rx UE may not receive the wideband RS resource configuration from the base station, but instead may determine the orthogonalized deterministic wideband RS resource partition.

As shown by reference number 510, the Rx UE may transmit the wideband echo RS to the Tx UE using the selected wideband RS resource. The Rx UE may transmit the wideband echo RS to the Tx UE over the sidelink interface. The wideband echo RS may occupy the entirety of the configured bandwidth of the Rx UE. The wideband echo RS may be generated based at least in part on a signature sequence associated with the Rx UE. The signature sequence associated with the Rx UE may be a uniquely generated sequence based at least in part on a UE ID associated with the Rx UE. By generating the wideband echo RS using the signature sequence associated with the Rx UE, the Tx UE may identify the Rx UE as transmitting the wideband echo RS.

In some aspects, the wideband beacon RS and the wideband echo RS may be sequences that are generated using maximum length sequences (m-sequences) with Pi/2 binary phase shift keying (BPSK) modulation. M-sequences with Pi/2 modulation may be used to maintain a reduced peak-to-average power ratio (PAPR), which may enable the wideband beacon RS and the wideband echo RS to be detectable at an increased distance.

In some aspects, the wideband beacon RS and the wideband echo RS may each be generated based at least in part on an initial seed. The initial seed may be a numerical value that is a function of a UE ID (e.g., a Tx UE ID or an Rx UE ID) and/or an optional slot ID. For the wideband beacon RS that is transmitted by the Tx UE and the wideband echo RS that is transmitted by the Rx UE, the wideband beacon RS and the wideband echo RS may be generated using one of several options. In a first option, the wideband beacon RS may be based at least in part on the Tx UE ID. The wideband echo RS may be based at least in part on the Rx UE ID. In a second option, the wideband beacon RS may be based at least in part on the Tx UE ID and the Rx UE ID. The wideband echo RS may be based at least in part on the Rx UE ID. In a third option, the wideband beacon RS may be based at least in part on the Tx UE ID. The wideband echo RS may be based at least in part on the Tx UE ID and the Rx UE ID. In a fourth option, the wideband beacon RS may be based at least in part on the Tx UE ID and the Rx UE ID. The wideband echo RS may be based at least in part on the Tx UE ID and the Rx UE ID.

As shown by reference number 512, the Tx UE may perform a channel estimation based at least in part on the wideband echo RS received from the Rx UE. The Tx UE may perform the channel estimation to estimate a channel between the Tx UE and the Rx UE.

As shown by reference number 514, the Tx UE may determine transmission parameter(s) based at least in part on the channel estimation performed on the channel between the Tx UE and the Rx UE. The transmission parameters may include a precoder (e.g., a precoding matrix), an MCS, a rank indicator, and/or a resource allocation.

As shown by reference number 516, the Tx UE may perform a transmission to the Rx UE based at least in part on the transmission parameters. For example, the Tx UE may transmit data to the Rx UE on the PSSCH. The Tx UE may apply the transmission parameters (e.g., the precoder, the MCS, the rank indicator, and/or the resource allocation) when transmitting the data to the Rx UE on the PSSCH.

In some aspects, the Tx UE may transmit the wideband beacon RS using the selected wideband RS resource. The Rx UE may be a destination node that is to receive the transmission from the Tx UE on the PSSCH. The wideband beacon RS may be generated based at least in part on the signature sequence associated with the Tx UE and the wideband echo RS may be generated based at least in part on the signature sequence associated with the Rx UE, where the signature sequence associated with the Tx UE may be orthogonal or near orthogonal to the signature sequence associated with the Rx UE. The orthogonality or near orthogonality between the signature sequences may enable the Tx UE to detect the wideband echo RS received from the Rx UE among a plurality of wideband beacon RSs and wideband echo RSs transmitted by other UEs. In other words, the Tx UE may determine that the detected wideband echo RS is received from the Rx UE based at least in part on the signature sequence associated with the Rx UE.

In some aspects, the Tx UE may monitor or measure subsequent sideband RS resources to detect the wideband echo RS received from the Rx UE. The Tx UE may monitor sideband RS resources in accordance with a timer or a window-based monitoring mechanism, which may save power at the Tx UE. The Tx UE may start the timer after transmitting the wideband beacon RS. The Tx UE may monitor the sideband RS resources until the timer expires. In other words, during the timer, the Tx UE may monitor the sideband RS resources in order to detect the wideband echo RS. After the timer expires, the Tx UE may stop monitoring the sideband RS resources.

In some aspects, the Tx UE and the Rx UE may be among a plurality of UEs that communicative over a sidelink interface. For example, the Tx UE may be a first UE, the Rx UE may be a second UE, and a third UE and a fourth UE may be included in the plurality of UEs that communicate over the sidelink interface. When a UE detects an RS on a wideband RS resource, the UE may determine whether the detected RS is a wideband beacon RS or a wideband echo RS. Without differentiation between detected RSs at the UEs, a ripple effect may be created among the plurality of UEs. For example, the first UE may transmit a wideband beacon RS to the second UE. The second UE may, in return, transmit a wideband echo RS to the first UE. However, the third UE may detect the wideband echo RS transmitted from the second UE to the first UE. The third UE may mistakenly determine that the wideband echo RS, which was actually transmitted from the second UE to the first UE, is a wideband beacon RS transmitted from the second UE to the third UE. As a result, the third UE may transmit an unnecessary wideband echo RS to the second UE. The fourth UE may detect the unnecessary wideband echo RS transmitted from the third UE. The fourth UE may mistakenly determine that the unnecessary wideband echo RS transmitted from the third UE is a wideband beacon RS transmitted from the third UE to the fourth UE. As a result, the fourth UE may transmit an unnecessary wideband echo RS to the third UE. Therefore, without differentiation between detected RSs at the UEs, a ripple effect may be created among the plurality of UEs.

In some aspects, wideband beacon RSs may be differentiated from wideband echo RSs. In a first option, a wideband beacon RS may be differentiated from a wideband echo RS based at least in part on a different signature sequence type. The wideband beacon RS may use an m-sequence and the wideband echo RS may use a Gold sequence, or vice versa.

In a second option, a wideband beacon RS may be differentiated from a wideband echo RS based at least in part on having different generator parameters but a same signature sequence type. The wideband beacon RS may use a different set of polynomial coefficients as compared to the wideband echo RS.

In a third option, a wideband beacon RS may be differentiated from a wideband echo RS based at least in part on having different initial seeds but a same signature sequence type and a same generator parameter.

In the third option, the wideband beacon RS may use a different initial seed length as compared to the wideband echo RS. An initial seed for the wideband beacon RS may be based at least in part on a Tx UE ID. An initial seed for the wideband echo RS may be based at least in part on the Tx UE ID and an Rx UE ID.

In the third option, the wideband beacon RS and the wideband echo RS may use a same initial seed length, but the wideband beacon RS may use a different seed value (e.g., a different prefix) as compared to the wideband echo RS. The seed value may be a value (e.g., a 1-bit value) that depends on whether the RS is a wideband beacon RS or a wideband echo RS. For example, the seed value may be equal to "1" when the RS is the wideband beacon RS and the seed value may be equal to "0" when the RS is the wideband echo RS, or vice versa. An initial seed for the wideband beacon RS may be based at least in part on the seed value (e.g., 1), the Tx UE ID, and the Rx UE ID. An initial seed for the wideband echo RS may be based at least in part on the seed value (e.g., 0), the Tx UE ID, and the Rx UE ID.

In some aspects, the wideband beacon-echo procedure may be a feature that is enabled or disabled by the Tx UE and/or the Rx UE. For example, the Tx UE and/or the Rx UE may determine whether to use the wideband beacon-echo procedure for channel estimation.

As indicated above, FIG. 5 is provided as an example. Other examples may differ from what is described with respect to FIG. 5.

Figure 6:
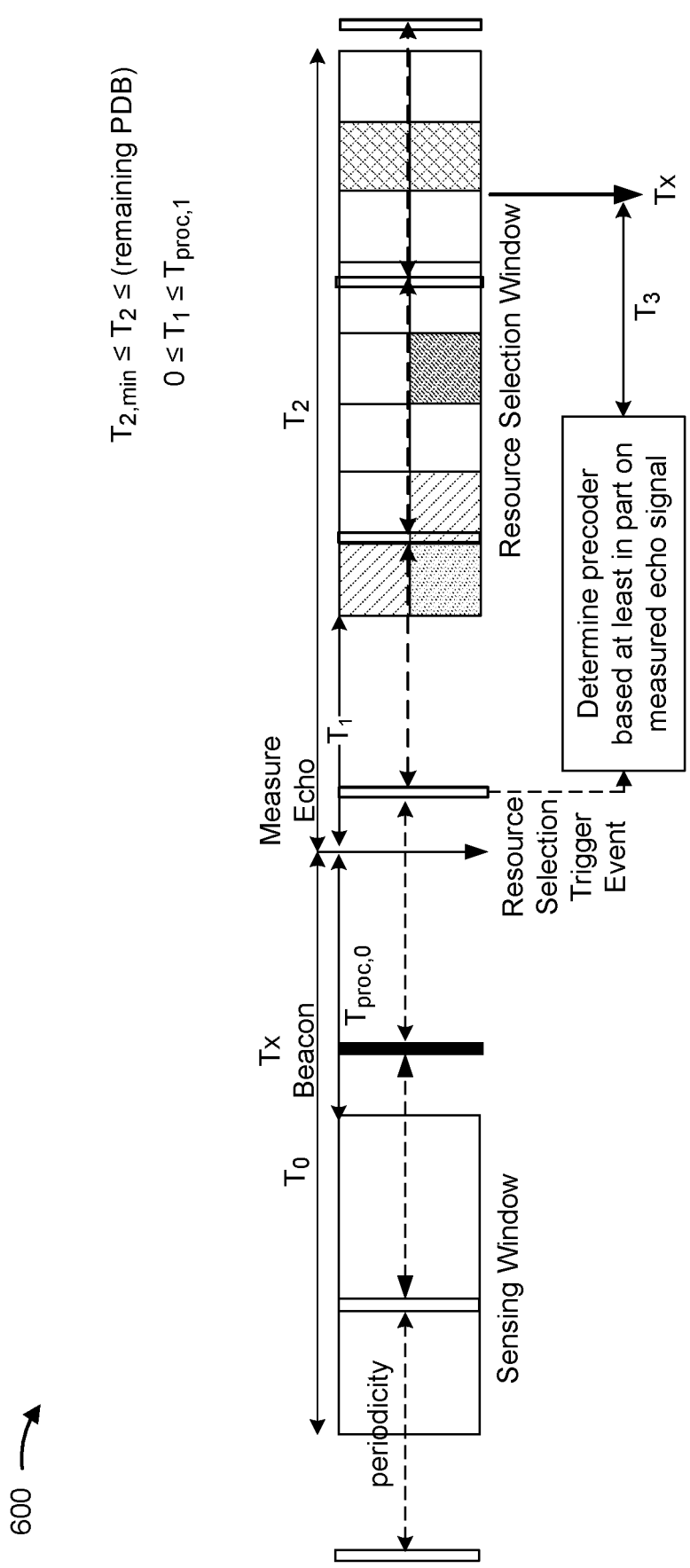

FIG. 6 is a diagram illustrating an example 600 of reference signaling for sidelink communication, in accordance with the present disclosure.

In some aspects, a sidelink UE (e.g., a Tx UE) may sense or detect sidelink resources during a sensing window. The sensing window may be followed in time by a resource selection trigger event, which may occur at the sidelink UE. The resource selection trigger event may be a triggering event to select resources for a sidelink data transmission from the sidelink UE. A time period from a start of the sensing window and the resource selection trigger event may be represented by $T_0$. A time period from an end of the sensing window and the resource selection trigger event may be represented by $T_{proc,0}$, which may be a first time parameter. In other words, a time period of the sensing window plus $T_{proc,0}$ may be equal to $T_0$. The resource selection trigger event may be followed in time by a resource selection window, during which the sidelink UE may perform the sidelink data transmission using a selected sidelink resource. The selected sidelink resource may be selected in a time domain and in a frequency domain from a plurality of sidelink resources. A time period from the resource selection trigger event and a start of the resource selection window may be represented by $T_1$, where $0 \leq T_1 \leq T_{proc,1}$ where $T_{proc,1}$ may be a second time parameter. A time period from the resource selection trigger event to an end of the resource selection window may be represented by $T_2$, where $T_{2,min} \leq T_2 \leq$ (remaining PDB), where $T_{2,min}$ represents a minimum $T_2$ value and a remaining PDB represents a remaining packet delay budget.

In some aspects, the sidelink UE may transmit a wideband beacon RS using a wideband RS resource. The sidelink UE may transmit the wideband beacon RS outside the sensing window and prior to the resource selection trigger event. The sidelink UE may detect or measure a wideband echo RS after the wideband beacon RS is transmitted from the sidelink UE. The wideband echo RS may be transmitted by another sidelink UE. The sidelink UE may determine transmission parameters (e.g., a precoder or precoding matrix) based at least in part on the measured wideband echo RS. The sidelink UE may perform the sidelink data transmission based at least in part on the transmission parameters. A time interval between a determination of the transmission parameters and the sidelink data transmission may be represented by $T_3$. The sidelink data transmission may be performed using the selected sidelink resource within the resource selection window.

As indicated above, FIG. 6 is provided as an example. Other examples may differ from what is described with respect to FIG. 6.

Figure 7:
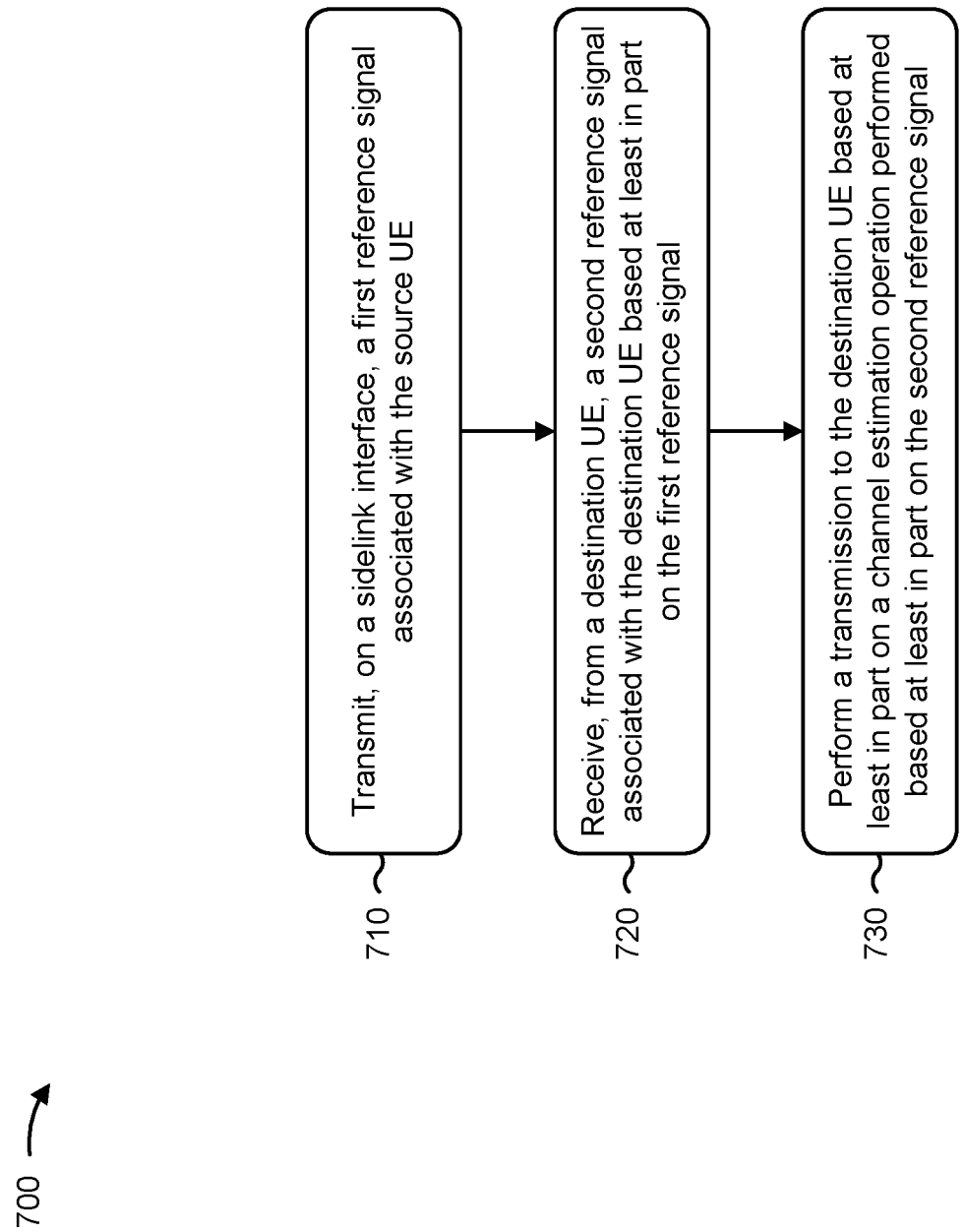

FIG. 7 is a diagram illustrating an example process 700 performed, for example, by a source UE, in accordance with the present disclosure. Example process 700 is an example where the source UE (e.g., UE 120a) performs operations associated with reference signaling for sidelink communication.

As shown in FIG. 7, in some aspects, process 700 may include transmitting, on a sidelink interface, a first reference signal associated with the source UE (block 710). For example, the UE (e.g., using antenna 252, transmit processor 264, TX MIMO processor 266, modulator 254, controller/processor 280, and/or memory 282) may transmit, on a sidelink interface, a first reference signal associated with the source UE, as described above, for example, with reference to FIGS. 5 and/or 6.

As further shown in FIG. 7, in some aspects, process 700 may include receiving, from a destination UE, a second reference signal associated with the destination UE based at least in part on the first reference signal (block 720). For example, the UE (e.g., using antenna 252, demodulator 254, MIMO detector 256, receive processor 258, controller/processor 280, and/or memory 282) may receive, from a destination UE, a second reference signal associated with the destination UE based at least in part on the first reference signal, as described above, for example, with reference to FIGS. 5 and/or 6.

As further shown in FIG. 7, in some aspects, process 700 may include performing a transmission to the destination UE based at least in part on a channel estimation operation performed based at least in part on the second reference signal (block 730). For example, the UE (e.g., using antenna 252, demodulator 254, MIMO detector 256, receive processor 258, transmit processor 264, TX MIMO processor 266, modulator 254, controller/processor 280, and/or memory 282) may perform a transmission to the destination UE based at least in part on channel estimation performed based at least in part on the second reference signal, as described above, for example, with reference to FIGS. 5 and/or 6.

Process 700 may include additional aspects, such as any single aspect or any combination of aspects described below and/or in connection with one or more other processes described elsewhere herein.

In a first aspect, the first reference signal and the second reference signal comprise wideband reference signals.

In a second aspect, alone or in combination with the first aspect, the wideband reference signals occupy an entirety of a configured bandwidth of the source UE.

In a third aspect, alone or in combination with one or more of the first and second aspects, process 700 includes performing a sensing operation on a plurality of reference signal resources associated with transmission of the first reference signal and reception of the second reference signal, and selecting a reference signal resource of the plurality of reference signal resources based at least in part on the sensing operation, wherein transmitting the first reference signal comprises transmitting the first reference signal on the selected reference signal resource.

In a fourth aspect, alone or in combination with one or more of the first through third aspects, the selected reference signal resource is selected randomly.

In a fifth aspect, alone or in combination with one or more of the first through fourth aspects, receiving the second reference signal further comprises monitoring one or more reference signal resources of the plurality of reference signal resources for the second reference signal, wherein the one or more reference signal resources occur later in time as compared to the selected reference signal resource, and wherein the one or more reference signal resources are monitored in accordance with a timer.

In a sixth aspect, alone or in combination with one or more of the first through fifth aspects, the sensing operation is performed prior to determining that the transmission is to be performed.

In a seventh aspect, alone or in combination with one or more of the first through sixth aspects, the plurality of reference signal resources are orthogonal to each other in at least one of a time domain or a frequency domain.

In an eighth aspect, alone or in combination with one or more of the first through seventh aspects, the selected reference signal resource is selected from a subset of the plurality of reference signal resources.

In a ninth aspect, alone or in combination with one or more of the first through eighth aspects, the subset of the plurality of reference signal resources is configured by a base station.

In a tenth aspect, alone or in combination with one or more of the first through ninth aspects, the subset of the plurality of reference signal resources is configured by a relay UE associated with the source UE.

In an eleventh aspect, alone or in combination with one or more of the first through tenth aspects, receiving, from the destination UE, the second reference signal further comprises monitoring for the second reference signal based at least in part on the transmission to the destination UE being directed to the destination UE.

In a twelfth aspect, alone or in combination with one or more of the first through eleventh aspects, the first reference signal is associated with the source UE based at least in part on a signature sequence associated with the source UE and the second reference signal is associated with the destination UE based at least in part on a signature sequence associated with the destination UE.

In a thirteenth aspect, alone or in combination with one or more of the first through twelfth aspects, receiving the second reference signal further comprises receiving a plurality of reference signals, including the second reference signal, from a plurality of UEs including the destination UE based at least in part on transmitting the first reference signal, and identifying the second reference signal as associated with the destination UE based at least in part on the signature sequence associated with the destination UE.

In a fourteenth aspect, alone or in combination with one or more of the first through thirteenth aspects, the plurality of reference signals are associated with respective signature sequences based at least in part on UE identifiers of the plurality of UEs.

In a fifteenth aspect, alone or in combination with one or more of the first through fourteenth aspects, the plurality of reference signals are based at least in part on respective signature sequences that are based at least in part on a binary phase shift keying modulation scheme and a maximum length sequence (m-sequence).

In a sixteenth aspect, alone or in combination with one or more of the first through fifteenth aspects, the first reference signal is based at least in part on a first signature sequence and the second reference signal is based at least in part on a second signature sequence, wherein the first signature sequence is based at least in part on a UE identifier of the source UE and the second signature sequence is based at least in part on a UE identifier of the destination UE.

In a seventeenth aspect, alone or in combination with one or more of the first through sixteenth aspects, the first reference signal is based at least in part on a first signature sequence and the second reference signal is based at least in part on a second signature sequence, wherein the first signature sequence is based at least in part on a UE identifier of the source UE and a UE identifier of the destination UE, and wherein the second signature sequence is based at least in part on the UE identifier of the destination UE.

In an eighteenth aspect, alone or in combination with one or more of the first through seventeenth aspects, the first reference signal is based at least in part on a first signature sequence and the second reference signal is based at least in part on a second signature sequence, wherein the first signature sequence is based at least in part on a UE identifier of the source UE, and wherein the second signature sequence is based at least in part on the UE identifier of the source UE and a UE identifier of the destination UE.

In a nineteenth aspect, alone or in combination with one or more of the first through eighteenth aspects, the first reference signal is based at least in part on a first signature sequence and the second reference signal is based at least in part on a second signature sequence, wherein the first signature sequence is based at least in part on a UE identifier of the source UE and a UE identifier of the destination UE, and wherein the second signature sequence is based at least in part on the UE identifier of the source UE and the UE identifier of the destination UE.

In a twentieth aspect, alone or in combination with one or more of the first through nineteenth aspects, the first reference signal is based at least in part on a first type of signature sequence and the second reference signal is based at least in part on a second type of signature sequence different than the first type of signature sequence.

In a twenty-first aspect, alone or in combination with one or more of the first through twentieth aspects, the first reference signal and the second reference signal are based at least in part on a same signature sequence with different generator parameters.

In a twenty-second aspect, alone or in combination with one or more of the first through twenty-first aspects, the first reference signal and the second reference signal are based at least in part on a same signature sequence with different initial seeds.

In a twenty-third aspect, alone or in combination with one or more of the first through twenty-second aspects, the different initial seeds have different seed lengths.

In a twenty-fourth aspect, alone or in combination with one or more of the first through twenty-third aspects, the different initial seeds have different seed values and a same seed length.

In a twenty-fifth aspect, alone or in combination with one or more of the first through twenty-fourth aspects, process 700 includes determining one or more parameters for the transmission to the destination UE based at least in part on the channel estimation operation, wherein the transmission to the destination UE is based at least in part on the one or more parameters.

In a twenty-sixth aspect, alone or in combination with one or more of the first through twenty-fifth aspects, the one or more parameters comprise at least one of a precoder, a modulation and coding scheme, a rank indicator, or a resource allocation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a destination UE, in accordance with the present disclosure. Example process 800 is an example where the destination UE (e.g., UE 120) performs operations associated with reference signaling for sidelink communication.

As shown in FIG. 8, in some aspects, process 800 may include receiving, on a sidelink interface, a first reference signal associated with a source UE (block 810). For example, the UE (e.g., using antenna 252, demodulator 254, MIMO detector 256, receive processor 258, controller/processor 280, and/or memory 282) may receive, on a sidelink interface, a first reference signal associated with a source UE, as described above, for example, with reference to FIGS. 5 and/or 6.

As further shown in FIG. 8, in some aspects, process 800 may include transmitting a second reference signal associated with the destination UE based at least in part on the first reference signal (block 820). For example, the UE (e.g., using antenna 252, transmit processor 264, TX MIMO processor 266, modulator 254, controller/processor 280, and/or memory 282) may transmit a second reference signal associated with the destination UE based at least in part on the first reference signal, as described above, for example, with reference to FIGS. 5 and/or 6.

As further shown in FIG. 8, in some aspects, process 800 may include receiving a transmission from the source UE based at least in part on the second reference signal (block 830). For example, the UE (e.g., using antenna 252, demodulator 254, MIMO detector 256, receive processor 258, controller/processor 280, and/or memory 282) may receive a transmission from the source UE based at least in part on the second reference signal, as described above, for example, with reference to FIGS. 5 and/or 6.

Process 800 may include additional aspects, such as any single aspect or any combination of aspects described below and/or in connection with one or more other processes described elsewhere herein.

In a first aspect, the first reference signal and the second reference signal comprise wideband reference signals.

In a second aspect, alone or in combination with the first aspect, the wideband reference signals occupy an entirety of a configured bandwidth of the destination UE.

In a third aspect, alone or in combination with one or more of the first and second aspects, process 800 includes selecting a reference signal resource of a plurality of reference signal resources configured for the destination UE, wherein transmitting the second reference signal comprises transmitting the second reference signal on the selected reference signal resource.

In a fourth aspect, alone or in combination with one or more of the first through third aspects, the selected reference signal resource is selected randomly.

In a fifth aspect, alone or in combination with one or more of the first through fourth aspects, the selected reference signal resource is selected from a plurality of reference signal resources that are orthogonal to each other in at least one of a time domain or a frequency domain.

In a sixth aspect, alone or in combination with one or more of the first through fifth aspects, the first reference signal is associated with the source UE based at least in part on a signature sequence associated with the source UE and the second reference signal is associated with the destination UE based at least in part on a signature sequence associated with the destination UE.

In a seventh aspect, alone or in combination with one or more of the first through sixth aspects, the first reference signal and the second reference signal are based at least in part on respective sequences that are based at least in part on a binary phase shift keying modulation scheme and a maximum length sequence (m-sequence).

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a source user equipment (UE), comprising: transmitting, on a sidelink interface, a first reference signal associated with the source UE; receiving, from a destination UE, a second reference signal associated with the destination UE based at least in part on the first reference signal; and performing a transmission to the destination UE based at least in part on a channel estimation operation performed based at least in part on the second reference signal.

Aspect 2: The method of Aspect 1, wherein the first reference signal and the second reference signal comprise wideband reference signals, and wherein the wideband reference signals occupy an entirety of a configured bandwidth of the source UE.

Aspect 3: The method of any of Aspects 1 through 2, further comprising: performing a sensing operation on a plurality of reference signal resources associated with transmission of the first reference signal and reception of the second reference signal; and randomly selecting a reference signal resource of the plurality of reference signal resources based at least in part on the sensing operation, wherein transmitting the first reference signal comprises: transmitting the first reference signal on the selected reference signal resource, and wherein transmitting the first reference signal comprises: transmitting the first reference signal on the selected reference signal resource.

Aspect 4: The method of Aspect 3, wherein receiving the second reference signal further comprises: monitoring one or more reference signal resources of the plurality of reference signal resources for the second reference signal, wherein the one or more reference signal resources occur later in time as compared to the selected reference signal resource, and wherein the one or more reference signal resources are monitored in accordance with a timer.

Aspect 5: The method of Aspect 3, wherein: the plurality of reference signal resources are orthogonal to each other in at least one of a time domain or a frequency domain; or the selected reference signal resource is randomly selected from a subset of the plurality of reference signal resources, wherein the subset of the plurality of reference signal resources is configured by a base station or the subset of the plurality of reference signal resources is configured by a relay UE associated with the source UE.

Aspect 6: The method of any of Aspects 1 through 5, wherein receiving, from the destination UE, the second reference signal further comprises: monitoring for the second reference signal based at least in part on the transmission to the destination UE being directed to the destination UE.

Aspect 7: The method of any of Aspects 1 through 6, wherein the first reference signal is associated with the source UE based at least in part on a signature sequence associated with the source UE and the second reference signal is associated with the destination UE based at least in part on a signature sequence associated with the destination UE.

Aspect 8: The method of Aspect 7, wherein receiving the second reference signal further comprises: receiving a plurality of reference signals, including the second reference signal, from a plurality of UEs including the destination UE based at least in part on transmitting the first reference signal; and identifying the second reference signal as associated with the destination UE based at least in part on the signature sequence associated with the destination UE.

Aspect 9: The method of Aspect 8, wherein: the plurality of reference signals are associated with respective signature sequences based at least in part on UE identifiers of the plurality of UEs; or the plurality of reference signals are based at least in part on respective signature sequences that are based at least in part on a binary phase shift keying modulation scheme and a maximum length sequence (m-sequence).

Aspect 10: The method of any of Aspects 1 through 9, wherein: the first reference signal is based at least in part on a first signature sequence and the second reference signal is based at least in part on a second signature sequence, wherein the first signature sequence is based at least in part on a UE identifier of the source UE and the second signature sequence is based at least in part on a UE identifier of the destination UE; or the first reference signal is based at least in part on the first signature sequence and the second reference signal is based at least in part on the second signature sequence, wherein the first signature sequence is based at least in part on the UE identifier of the source UE and the UE identifier of the destination UE, and wherein the second signature sequence is based at least in part on the UE identifier of the destination UE.

Aspect 11: The method of any of Aspects 1 through 10, wherein: the first reference signal is based at least in part on a first signature sequence and the second reference signal is based at least in part on a second signature sequence, wherein the first signature sequence is based at least in part on a UE identifier of the source UE, and wherein the second signature sequence is based at least in part on the UE identifier of the source UE and a UE identifier of the destination UE; or the first reference signal is based at least in part on the first signature sequence and the second reference signal is based at least in part on the second signature sequence, wherein the first signature sequence is based at least in part on the UE identifier of the source UE and the UE identifier of the destination UE, and wherein the second signature sequence is based at least in part on the UE identifier of the source UE and the UE identifier of the destination UE.

Aspect 12: The method of any of Aspects 1 through 11, wherein: the first reference signal is based at least in part on a first type of signature sequence and the second reference signal is based at least in part on a second type of signature sequence different than the first type of signature sequence; the first reference signal and the second reference signal are based at least in part on a same signature sequence with different generator parameters; or the first reference signal and the second reference signal are based at least in part on a same signature sequence with different initial seeds, wherein the different initial seeds have different seed lengths, or the different initial seeds have different seed values and a same seed length.

Aspect 13: The method of any of Aspects 1 through 12, further comprising: determining one or more parameters for the transmission to the destination UE based at least in part on the channel estimation operation, wherein the transmission to the destination UE is based at least in part on the one or more parameters, wherein the one or more parameters comprise at least one of: a precoder, a modulation and coding scheme, a rank indicator, or a resource allocation.

Aspect 14: A method of wireless communication performed by a destination user equipment (UE), comprising: receiving, on a sidelink interface, a first reference signal associated with a source UE; transmitting a second reference signal associated with the destination UE based at least in part on the first reference signal; and receiving a transmission from the source UE based at least in part on the second reference signal.

Aspect 15: The method of Aspect 14, wherein the first reference signal and the second reference signal comprise wideband reference signals, and wherein the wideband reference signals occupy an entirety of a configured bandwidth of the destination UE.

Aspect 16: The method of any of Aspects 14 through 15, further comprising: randomly selecting a reference signal resource of a plurality of reference signal resources configured for the destination UE, and wherein the selected reference signal resource is selected from a plurality of reference signal resources that are orthogonal to each other in at least one of a time domain or a frequency domain, wherein transmitting the second reference signal comprises: transmitting the second reference signal on the selected reference signal resource, wherein transmitting the second reference signal comprises: transmitting the second reference signal on the selected reference signal resource.

Aspect 17: The method of any of Aspects 14 through 16, wherein: the first reference signal is associated with the source UE based at least in part on a signature sequence associated with the source UE and the second reference signal is associated with the destination UE based at least in part on a signature sequence associated with the destination UE; or the first reference signal and the second reference signal are based at least in part on respective signature sequences that are based at least in part on a binary phase shift keying modulation scheme and a maximum length sequence (m-sequence).

Aspect 18: An apparatus for wireless communication at a device, comprising a processor; memory coupled with the processor; and instructions stored in the memory and executable by the processor to cause the apparatus to perform the method of one or more of Aspects 1-13.

Aspect 19: A device for wireless communication, comprising a memory and one or more processors coupled to the memory, the one or more processors configured to perform the method of one or more of Aspects 1-13.

Aspect 20: An apparatus for wireless communication, comprising at least one means for performing the method of one or more of Aspects 1-13.

Aspect 21: A non-transitory computer-readable medium storing code for wireless communication, the code comprising instructions executable by a processor to perform the method of one or more of Aspects 1-13.

Aspect 22: A non-transitory computer-readable medium storing a set of instructions for wireless communication, the set of instructions comprising one or more instructions that, when executed by one or more processors of a device, cause the device to perform the method of one or more of Aspects 1-13.

Aspect 23: An apparatus for wireless communication at a device, comprising a processor; memory coupled with the processor; and instructions stored in the memory and executable by the processor to cause the apparatus to perform the method of one or more of Aspects 14-17.

Aspect 24: A device for wireless communication, comprising a memory and one or more processors coupled to the memory, the one or more processors configured to perform the method of one or more of Aspects 14-17.

Aspect 25: An apparatus for wireless communication, comprising at least one means for performing the method of one or more of Aspects 14-17.

Aspect 26: A non-transitory computer-readable medium storing code for wireless communication, the code comprising instructions executable by a processor to perform the method of one or more of Aspects 14-17.

Aspect 27: A non-transitory computer-readable medium storing a set of instructions for wireless communication, the set of instructions comprising one or more instructions that, when executed by one or more processors of a device, cause the device to perform the method of one or more of Aspects 14-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a source user equipment (UE), comprising:
   transmitting, on a sidelink interface, a wideband beacon reference signal associated with the source UE;
   receiving, from a destination UE, a wideband echo reference signal associated with the destination UE based at least in part on the wideband beacon reference signal; and transmitting, to the destination UE, a transmission based at least in part on a channel estimation operation performed based at least in part on the wideband echo reference signal.

2. The method of claim 1, wherein the wideband beacon reference signal and the wideband echo reference signal occupy an entirety of a configured bandwidth of the source UE.

3. The method of claim 1, further comprising:
performing a sensing operation on a plurality of reference signal resources associated with transmission of the wideband beacon reference signal and reception of the wideband echo reference signal; and
randomly selecting a reference signal resource of the plurality of reference signal resources based at least in part on the sensing operation, and
wherein transmitting the wideband beacon reference signal comprises:
transmitting the wideband beacon reference signal on the selected reference signal resource.

4. The method of claim 3, wherein receiving the wideband echo reference signal further comprises:
monitoring one or more reference signal resources of the plurality of reference signal resources for the wideband echo reference signal, wherein the one or more reference signal resources occur later in time as compared to the selected reference signal resource, and wherein the one or more reference signal resources are monitored in accordance with a timer.

5. The method of claim 3, wherein:
the plurality of reference signal resources are orthogonal to each other in at least one of a time domain or a frequency domain; or
the selected reference signal resource is randomly selected from a subset of the plurality of reference signal resources, wherein the subset of the plurality of reference signal resources is configured by a base station or the subset of the plurality of reference signal resources is configured by a relay UE associated with the source UE.

6. The method of claim 1, wherein receiving, from the destination UE, the wideband echo reference signal further comprises:
monitoring for the wideband echo reference signal based at least in part on the transmission to the destination UE being directed to the destination UE.

7. The method of claim 1, wherein the wideband beacon reference signal is associated with the source UE based at least in part on a signature sequence associated with the source UE and the wideband echo reference signal is associated with the destination UE based at least in part on a signature sequence associated with the destination UE.

8. The method of claim 7, wherein receiving the wideband echo reference signal further comprises:
receiving a plurality of reference signals, including the wideband echo reference signal, from a plurality of UEs including the destination UE based at least in part on transmitting the wideband beacon reference signal; and
identifying the wideband echo reference signal as associated with the destination UE based at least in part on the signature sequence associated with the destination UE.

9. The method of claim 8, wherein:
the plurality of reference signals are associated with respective signature sequences based at least in part on UE identifiers of the plurality of UEs; or the plurality of reference signals are based at least in part on respective signature sequences that are based at least in part on a binary phase shift keying modulation scheme and a maximum length sequence (m-sequence).

10. The method of claim 1, wherein:
the wideband beacon reference signal is based at least in part on a first signature sequence and the wideband echo reference signal is based at least in part on a second signature sequence, wherein the first signature sequence is based at least in part on a UE identifier of the source UE and the second signature sequence is based at least in part on a UE identifier of the destination UE; or
the wideband beacon reference signal is based at least in part on the first signature sequence and the wideband echo reference signal is based at least in part on the second signature sequence, wherein the first signature sequence is based at least in part on the UE identifier of the source UE and the UE identifier of the destination UE, and wherein the second signature sequence is based at least in part on the UE identifier of the destination UE.

11. The method of claim 1, wherein:
the wideband beacon reference signal is based at least in part on a first signature sequence and the wideband echo reference signal is based at least in part on a second signature sequence, wherein the first signature sequence is based at least in part on a UE identifier of the source UE, and wherein the second signature sequence is based at least in part on the UE identifier of the source UE and a UE identifier of the destination UE; or
the wideband beacon reference signal is based at least in part on the first signature sequence and the wideband echo reference signal is based at least in part on the second signature sequence, wherein the first signature sequence is based at least in part on the UE identifier of the source UE and the UE identifier of the destination UE, and wherein the second signature sequence is based at least in part on the UE identifier of the source UE and the UE identifier of the destination UE.

12. The method of claim 1, wherein:
the wideband beacon reference signal is based at least in part on a first type of signature sequence and the wideband echo reference signal is based at least in part on a second type of signature sequence different than the first type of signature sequence;
the wideband beacon reference signal and the wideband echo reference signal are based at least in part on a same signature sequence with different generator parameters; or
the wideband beacon reference signal and the wideband echo reference signal are based at least in part on a same signature sequence with different initial seeds, wherein the different initial seeds have different seed lengths, or the different initial seeds have different seed values and a same seed length.

13. The method of claim 1, further comprising:
determining one or more parameters for the transmission to the destination UE based at least in part on the channel estimation operation, wherein the transmission to the destination UE is based at least in part on the one or more parameters, wherein the one or more parameters comprise at least one of: a precoder, a modulation and coding scheme, a rank indicator, or a resource allocation.

14. A method of wireless communication performed by a destination user equipment (UE), comprising:
receiving, on a sidelink interface, a wideband beacon reference signal associated with a source UE;
transmitting a wideband echo reference signal associated with the destination UE based at least in part on the wideband beacon reference signal; and
receiving a transmission from the source UE based at least in part on the wideband echo reference signal.

15. The method of claim 14, wherein the wideband beacon reference signal and the wideband echo reference signal occupy an entirety of a configured bandwidth of the destination UE.

16. The method of claim 14, further comprising:
randomly selecting a reference signal resource of a plurality of reference signal resources configured for the destination UE, wherein the selected reference signal resource is randomly selected from the plurality of reference signal resources that are orthogonal to each other in at least one of a time domain or a frequency domain,
wherein transmitting the wideband echo reference signal comprises:
transmitting the wideband echo reference signal on the selected reference signal resource.

17. The method of claim 14, wherein:
the wideband beacon reference signal is associated with the source UE based at least in part on a signature sequence associated with the source UE and the wideband echo reference signal is associated with the destination UE based at least in part on a signature sequence associated with the destination UE; or
the wideband beacon reference signal and the wideband echo reference signal are based at least in part on respective signature sequences that are based at least in part on a binary phase shift keying modulation scheme and a maximum length sequence (m-sequence).

18. A source user equipment (UE) for wireless communication, comprising:
a memory;
a transceiver; and
one or more processors, coupled to the memory, configured to:
transmit, on a sidelink interface via the transceiver, a wideband beacon reference signal associated with the source UE;
receive, from a destination UE via the transceiver, a wideband echo reference signal associated with the destination UE based at least in part on the wideband beacon reference signal; and
transmit, to the destination UE via the transceiver, a transmission based at least in part on a channel estimation operation performed based at least in part on the second wideband echo reference signal.

19. The source UE of claim 18, wherein the one or more processors are further configured to:
perform a sensing operation on a plurality of reference signal resources associated with transmission of the wideband beacon reference signal and reception of the wideband echo reference signal; and
randomly select a reference signal resource of the plurality of reference signal resources based at least in part on the sensing operation,
wherein the one or more processors, to transmit the wideband beacon reference signal, are configured to:
transmit the wideband beacon reference signal on the selected reference signal resource.

20. The source UE of claim 19, wherein the one or more processors, to receive the wideband echo reference signal, are configured to:
monitor one or more reference signal resources of the plurality of reference signal resources for the wideband echo reference signal, wherein the one or more reference signal resources occur later in time as compared to the selected reference signal resource, and wherein the one or more reference signal resources are monitored in accordance with a timer.

21. The source UE of claim 19, wherein:
the plurality of reference signal resources are orthogonal to each other in at least one of a time domain or a frequency domain; or
the selected reference signal resource is randomly selected from a subset of the plurality of reference signal resources, wherein the subset of the plurality of reference signal resources is configured by a base station or the subset of the plurality of reference signal resources is configured by a relay UE associated with the source UE.

22. The source UE of claim 18, wherein the one or more processors, to receive, from the destination UE, the wideband echo reference signal, are configured to:
monitor for the wideband echo reference signal based at least in part on the transmission to the destination UE being directed to the destination UE.

23. The source UE of claim 18, wherein the wideband beacon reference signal is associated with the source UE based at least in part on a signature sequence associated with the source UE and the wideband echo reference signal is associated with the destination UE based at least in part on a signature sequence associated with the destination UE.

24. The source UE of claim 23, wherein the one or more processors, to receive the wideband echo reference signal, are configured to:
receive a plurality of reference signals, including the wideband echo reference signal, from a plurality of UEs including the destination UE based at least in part on transmitting the wideband beacon reference signal; and
identify the wideband echo reference signal as associated with the destination UE based at least in part on the signature sequence associated with the destination UE.

25. The source UE of claim 18, wherein:
the wideband beacon reference signal is based at least in part on a first signature sequence and the wideband echo reference signal is based at least in part on a second signature sequence, wherein the first signature sequence is based at least in part on a UE identifier of the source UE and the second signature sequence is based at least in part on a UE identifier of the destination UE; or
the wideband beacon reference signal is based at least in part on the first signature sequence and the wideband echo reference signal is based at least in part on the second signature sequence, wherein the first signature sequence is based at least in part on a UE identifier of the source UE and a UE identifier of the destination UE, and wherein the second signature sequence is based at least in part on the UE identifier of the destination UE.

26. The source UE of claim 18, wherein:

the wideband beacon reference signal is based at least in part on a first signature sequence and the wideband echo reference signal is based at least in part on a second signature sequence, wherein the first signature sequence is based at least in part on a UE identifier of the source UE, and wherein the second signature sequence is based at least in part on the UE identifier of the source UE and a UE identifier of the destination UE; or the wideband beacon reference signal is based at least in part on the first signature sequence and the wideband echo reference signal is based at least in part on the second signature sequence, wherein the first signature sequence is based at least in part on a UE identifier of the source UE and a UE identifier of the destination UE, and wherein the second signature sequence is based at least in part on the UE identifier of the source UE and the UE identifier of the destination UE.

27. The source UE of claim 18, wherein:

the wideband beacon reference signal is based at least in part on a first type of signature sequence and the wideband echo reference signal is based at least in part on a second type of signature sequence different than the first type of signature sequence;

the wideband beacon reference signal and the wideband echo reference signal are based at least in part on a same signature sequence with different generator parameters; or the wideband beacon reference signal and the wideband echo reference signal are based at least in part on a same signature sequence with different initial seeds, wherein the different initial seeds have different seed lengths, or the different initial seeds have different seed values and a same seed length.

28. A destination user equipment (UE) for wireless communication, comprising:
a memory;
a transceiver; and
one or more processors, coupled to the memory, configured to:
receive, on a sidelink interface via the transceiver, a wideband beacon reference signal associated with a source UE;
transmit, via the transceiver, a wideband echo reference signal associated with the destination UE based at least in part on the wideband beacon reference signal; and
receive, via the transceiver, a transmission from the source UE based at least in part on the wideband echo reference signal.

29. The destination UE of claim 28, wherein the one or more processors are further configured to:
Randomly select a reference signal resource of a plurality of reference signal resources configured for the destination UE, wherein the selected reference signal resource is randomly selected from the plurality of reference signal resources that are orthogonal to each other in at least one of a time domain or a frequency domain,
wherein the one or more processors, to transmit the wideband echo reference signal, are configured to:
transmit the wideband echo reference signal on the selected reference signal resource.

30. The destination UE of claim 28, wherein:
the wideband beacon reference signal is associated with the source UE based at least in part on a signature sequence associated with the source UE and the wideband echo reference signal is associated with the destination UE based at least in part on a signature sequence associated with the destination UE; or
the wideband beacon reference signal and the wideband echo reference signal are based at least in part on respective signature sequences that are based at least in part on a binary phase shift keying modulation scheme and a maximum length sequence (m-sequence).

* * * * *